United States Patent [19]

Koyama et al.

[11] Patent Number: 4,658,162
[45] Date of Patent: Apr. 14, 1987

[54] PRINTED COIL UNIT FOR SMALL SIZE ACTUATOR

[75] Inventors: Ryouhei Koyama, Hyuga; Yoshinobu Haruta, Tokyo, both of Japan

[73] Assignee: Asahi Kasei Kogyo Kabushiki Kaisha, Osaka, Japan

[21] Appl. No.: 758,070

[22] Filed: Jul. 23, 1985

[30] Foreign Application Priority Data

| Jul. 23, 1984 | [JP] | Japan | 59-110243[U] |
| Aug. 28, 1984 | [JP] | Japan | 59-129295[U] |
| Aug. 29, 1984 | [JP] | Japan | 59-129845[U] |
| May 17, 1985 | [JP] | Japan | 60-104076 |

[51] Int. Cl.$^4$ .................................................. H02K 11/00
[52] U.S. Cl. ........................................ 310/68 R; 310/184; 310/268; 310/DIG. 3; 310/DIG. 6; 318/135; 318/254; 324/208
[58] Field of Search .............. 310/40 MM, 68 R, 156, 310/68 B, DIG. 6, 268, 12, 45, 13, DIG. 3, 46, 43, 71, 180, 184; 318/138, 135, 254 R, 254 A; 336/200; 324/108, 219, 207

[56] References Cited

U.S. PATENT DOCUMENTS

| 4,093,897 | 6/1978 | Fujita | 318/138 |
| 4,109,170 | 8/1978 | Fujita | 310/268 |
| 4,127,799 | 11/1978 | Nakamura | 318/254 A |
| 4,251,795 | 2/1981 | Shibasaki | 324/252 |
| 4,260,920 | 4/1981 | Nakamura | 310/68 R |
| 4,296,424 | 10/1981 | Shibasaki | 174/68.5 |
| 4,340,833 | 7/1982 | Sudo | 310/268 |
| 4,371,817 | 2/1983 | Muller | 310/46 |
| 4,392,013 | 7/1983 | Ohmura | 174/68.5 |
| 4,392,031 | 7/1983 | Curtis, III | 200/16 R |
| 4,401,521 | 8/1983 | Ohmura | 204/12 |
| 4,455,516 | 6/1984 | Furusho | 318/254 R |

FOREIGN PATENT DOCUMENTS

| 58/3558 | 1/1983 | Japan | 310/268 |
| 0115853 | 8/1983 | Japan . | |
| 0090269 | 6/1984 | Japan . | |
| 0090284 | 6/1984 | Japan . | |
| 0193272 | 9/1984 | Japan . | |

*Primary Examiner*—R. Skudy
*Attorney, Agent, or Firm*—Finnegan, Henderson, Farabow, Garrett & Dunner

[57] ABSTRACT

A printed coil unit for use in a very thin type flat brushless motor or a linear actuator, in which a magnetic sensor element having a thickness smaller than 0.6 mm is embedded integrally within the coil unit without projecting therefrom in a region located outside and in the vicinity of spiral conductor coil patterns. The printed coil unit includes a single printed coil sheet or a lamination of such coil sheets each having more than one spiral conductor patterns on the same plane. A magnetic sensor element, such as Hall element or magneto-resistance element having a thickness equal to or smaller than that of the printed coil sheet is embedded within the coil sheet at blank regions located between adjacent spiral conductor patterns, or regions made availably by diminishing the size of a selected one of the spiral conductor patterns. A moving speed detecting coil or patterned conductor can be additionally provided on the other available area of the coil sheet.

15 Claims, 42 Drawing Figures

FIG. IIA
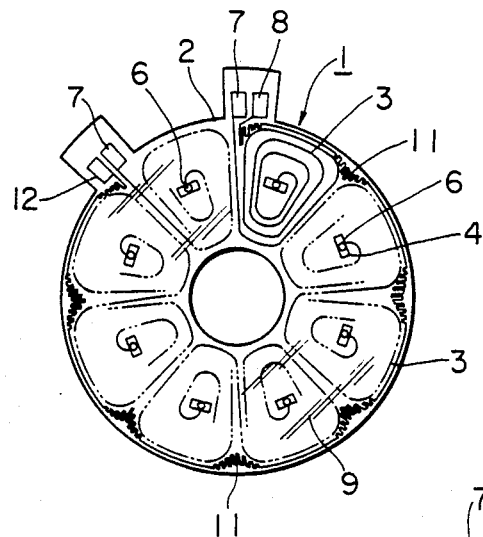
FIG. IIB
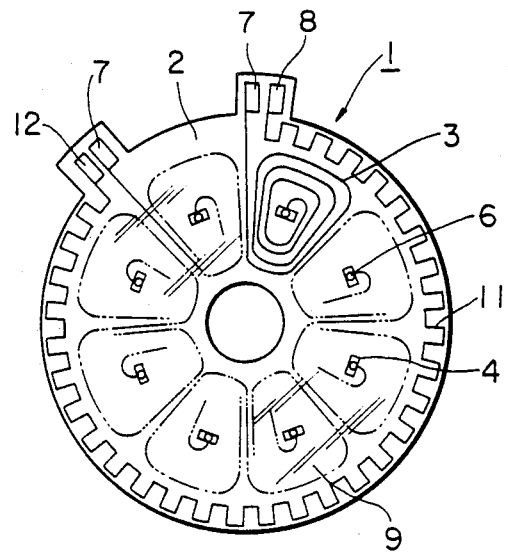
FIG. IIC
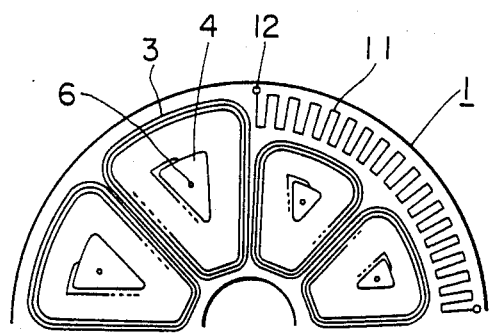

PRINTED COIL UNIT FOR SMALL SIZE ACTUATOR

BACKGROUND OF THE INVENTION

The present invention relates to a printed coil unit for an actuator of a very small size and thickness.

With the term "actuator", it is intended to mean an apparatus composed of coils, magnetic circuits and the like for converting electric energy into mechanical energy through the medium of electromagnetic energy. The part constituted by the coils of the actuator is generally referred to as the coil unit. In the case of a coil unit where printed coils are used, most of the coil units are usually constituted by a laminated structure including a plurality of laminated or stacked printed coil sheets.

In accompaniment to remarkable technological progress in the field of audio, video, office automation (OA) and the like systems as well as increasing tendency to implement associated devices and equipment in a reduced size and thin structure, there arises a great demand for miniaturization and implementation of thin cross-sectional structure for the actuators employed in these systems or equipment.

Taking a flat brushless motor as an example of the actuator intended for the use mentioned above and referring to FIG. 2A of the accompanying drawings, the motor includes a magnet 21 uniformly magnetized divisionally in the circumferential direction to thereby constitute a rotor, and a coil unit 23 comprising a laminated structure of printed coil sheets (only one sheet shown for clarity) provided with spiral conductor patterns in a number corresponding to that of the magnetic poles of the rotor magnet, the coil unit 23 constituting a stator of the motor. Since the printed coil is very thin when compared with a wound coil, the actuator employing the printed coil unit permits the gap between a yoke plate 24 and the magnet 21 to be significantly reduced, as a result of which torque of an increased magnitude can be produced because of the increased intensity of the magnetic field at the location of the coil.

In an actuator of this type, a current supplied to the coils is switched by means of a current switching transistor which is controlled on the basis of an electric signal produced by a magneto-electric transducer element or magnetic sensor e.g., sensor element 22 in FIG. 2A element (or magnetism detecting element), such as a Hall element or a magneto-resistance element for detecting the rotational or angular position of the rotor magnet, the signal having a magnitude proportional to the detected field intensity. In this connection, it is noted that the very thin structure of the coil unit including the laminated printed coil sheets, which allows the distance or gap between the magnet 21 and the yoke plate 24 to be reduced can cause problems in installing the magnetic sensor element which occupies a relatively increased space in the gap between the magnet and the yoke plate. As examples of relatively thick components heretofore used for the magnetic sensor element 22, there may be mentioned a Hall element, a magneto-resistance element or the like all of which have thicknesses greater than 0.9 mm. Heretofore, the magnetic sensor element 22 has been mounted on the coil unit 23 with the gap being increased so that the sensor element is not brought into contact with the magnet 21 disposed in opposition thereto, as shown in FIG. 2B. With such disposition of the magnetic sensor element, it is however impossible to take advantage of the characteristic of the printed coil realize a very thin structure, because the gap distance between the magnet and the coil is increased due to the disposition of the sensor element. An attempt to dispose the magnetic sensor element at a position located outside of the main magnetic flux field of the magnet with a view to reducing the thickness of the actuator will encounter another difficulty in that the sensitivity of the magnetic sensor element is lowered, resulting in the need for an amplifier having high sensitivity to process the output signal of the sensor element. However, the signal-to-noise (S/N) ratio will be then degraded, and the overall expense of the actuator increased.

In the prior art actuator under consideration, there is also disposed between the printed coil unit and the magnet a frequency-generation (FG) coil formed in a unique substrate for detecting the moving speed of a movable part or member of the actuator. This further structural requirement generally involves increasing the thickness of the assembly as a whole. Japanese Utility Model Application Laid-Open No. 58-115853 discloses in more detail such a printed drive coil and a FB coil provided on the same carrier.

SUMMARY OF THE INVENTION

An object of the present invention is to provide a novel and improved structure of a printed coil unit provided integrally with a magnetic sensor element and/or a frequency generating (FG) coil for detecting the moving speed of a movable part, which would allow actuators, such as flat brushless motors, linear actuator or the like to be constructed to have a very thin structure. With the invention, it is also contemplated to provide a method of manufacturing the coil unit.

In view of the above object, according to an aspect of the invention a mgnetic sensor element of 0.6 mm or less in thickness is embedded or buried within a portion of a spiral-type printed coil unit outside of those regions where the spiral conductor patterns are formed, to thereby solve the problems encountered in the prior art actuators. Further, a FG coil is integrally, and in a planar fashion, incorporated in the coil unit according to another feature of the invention.

According to a general aspect of the invention, there is provided a print coil unit for an actuator of a small size including a single printed coil sheet or a lamination of plural printed coil sheets, wherein the printed coil sheet is provided with printed coils and disposed in opposition to a magnet formed and oriented so as to present one or more magnetic poles on the same plane. Each of the printed coil sheets has one or more spiral conductor patterns deposited on the same plane, and one or more magnetic sensor elements having a thickness equal to or less than that of the printed coil sheet are embedded in a region located outside of the spiral conductor pattern.

BRIEF DESCRIPTION OF THE DRAWINGS

FIGS. 11A, 11B and 11C are views showing three examples of the printed coil sheets for flat brushless motors constructed in accordance with the present invention for illustrating positional relationships between spiral coil conductor patterns and FG coil elements, respectively;

Throughout the drawings, like numerals and symbols indicate like parts and components.

DESCRIPTION OF THE PREFERRED EMBODIMENTS

Figure 1A:
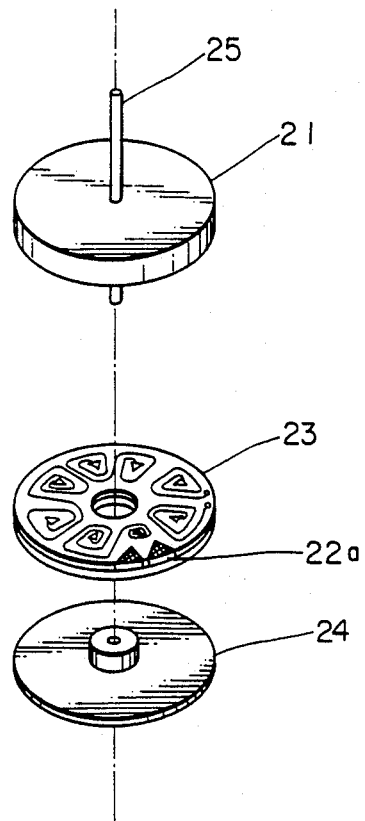
FIGS. 1A and 1B show a flat brushless motor incorporating the present invention in an exploded perspective view and a schematic sectional view, respectively.
Figure 1B:
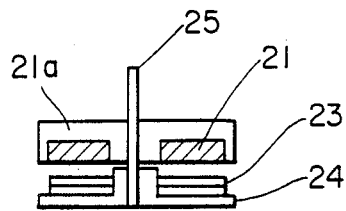
Figure 1C:
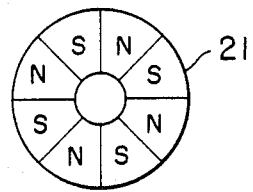
FIG. 1C shows a plan view of the magnet member in FIG. 1B.
Figure 2A:
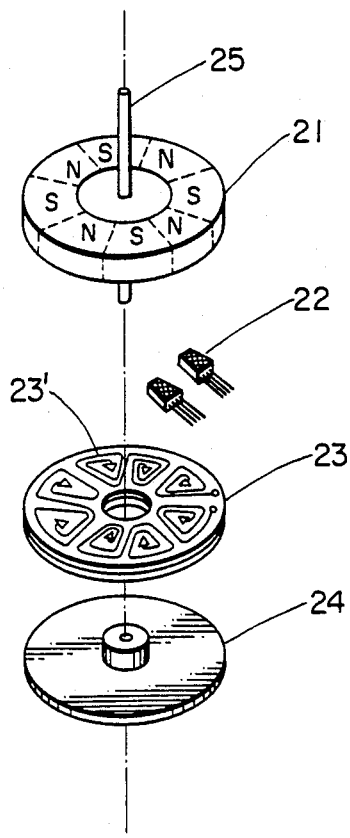
FIGS. 2A and 2B show a prior art flat brushless motor including a conventional printed coil unit in an exploded perspective view and a schematic sectional view, respectively.
Figure 2B:
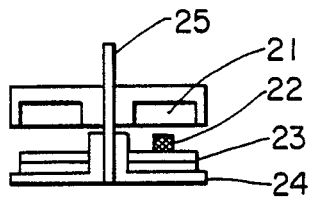

FIGS. 1A–1C show an exemplary embodiment of an actuator incorporating a printed coil unit according to the present invention in the form of a flat brushless motor of a small size.

Although the printed coils or coil unit according to the present invention may be fabricated, for example, through an etching process, plating process or a combination thereof, it is preferred to produce the printed coil in accordance with the fabrication process disclosed in U.S. Pat. No. 4,401,521 (corresponding to Japanese Patent Application Laid-Open No. 57-91590) and U.S. Pat. No. 4,392,013 both owned by the present assignee. Each coil sheet of the printed coil unit should advantageously be implemented with a diameter in a range of 5 to 40 mm and a thickness of 0.1 to 2 mm. Additionally, the conductor density of the coil should preferably be selected to be 2 to 20 lines/mm, and more preferably 5 to 20 lines/mm with a line width ranging from 50 μm to 200 μm.

Figure 3A:
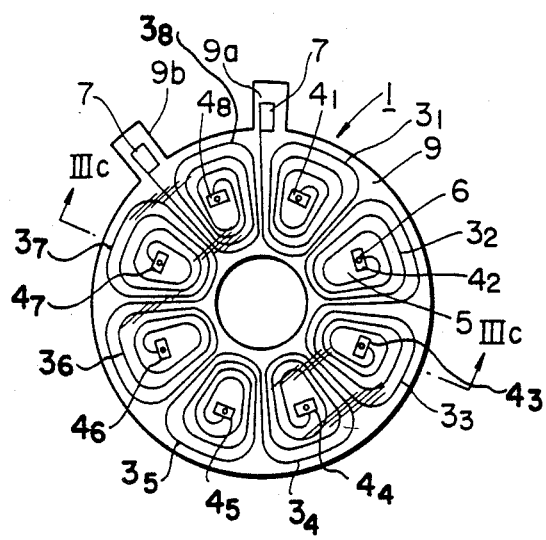
FIGS. 3A, 3B and 3C show a printed coil unit for a flat brushless motor to which the present invention can be applied in a top plan view, a bottom plan view and a sectional view, respectively.
Figure 3B:
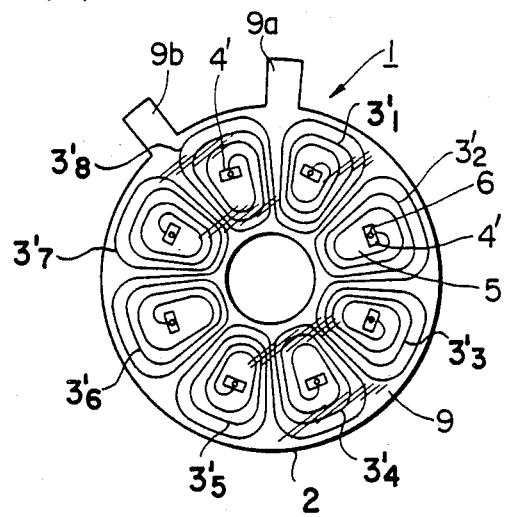
Figure 3C:
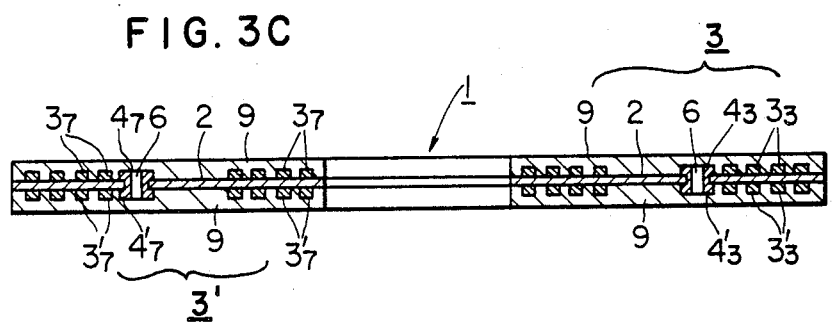

FIGS. 3A–3C show an example of the printed coil employed according to the teaching of the invention. On the asumption that a magnet magnetized so as to present n N- and S-poles, respectively, is employed, 2n spiral patterns 3 in total are formed on both planar surfaces of a printed coil carrier sheet member 2(n is a positive integer). In the case of printed coil unit 1 partially illustrated in FIGS. 3A-3C, eight spiral conductor patterns 3 are formed for realizing four magnetic N poles and four S poles, respectively. In this connection, it is to be noted that the number of the spiral conductor patterns is to be counted such that two spiral conductor patterns $3_1$-$3_8$, $3_1'$-$3_8'$ disposed in opposition to each other with the supporting or carrier member 2 being interposed therebetween constitute a single set of spiral conductor patterns. Carrier member 2 and conductor patterns $3_1$-$3_8$ and $3_1'$-$3_8'$ are encapsulated in an insulating coating to constitute coil sheet 9. In other words, with the expression "one spiral conductor pattern", it should be understood that the one spiral conductor pattern includes in reality a pair of the spiral conductor patterns formed on the opposed sides of the coil carrier, respectively, in opposition to each other and interconnected with thru-hole lands ($4_1$-$4_8$, $4_1'$-$4_8'$) through a respective thru-hole 6. In general, the spiral conductor patterns 3 are disposed on or along the same circle having the center which coincides with those of a motor shaft 25 and a magnet 21. An insulating coating is applied. One end of the spiral conductor patterns $3_1$ and $3_8$ are connected to external electrode terminals 7 provided in protruding portions 9a, 9b, respectively.

There are formed thru-holes 6 in the coil carrier or supporting member 2 in a number required for electrically connecting the spiral conductor patterns formed on both sides of the interposed printed coil carrier member 2 which may be made of any electrically insulating material. By way of example, the printed coil carrier member may be advantageously constructed by a glass epoxy substrate, polyimide film, epoxy resin film or a similar material in sheet form. Of course, the thru-hole may be formed by any appropriate method.

Figure 4A:
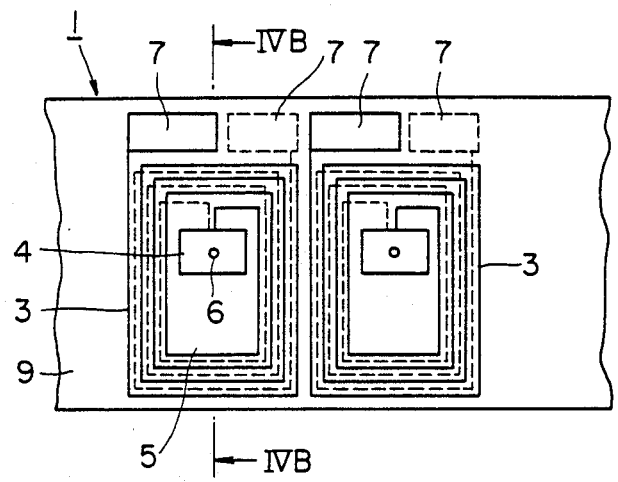
FIGS. 4A and 4B show a printed coil unit for a linear actuator to which the present invention can be applied in a plan view and a sectional view, respectively.
Figure 4B:
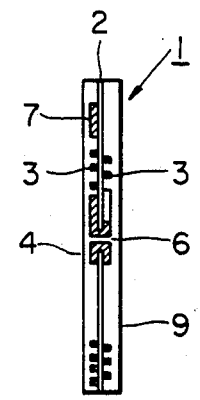

FIGS. 4A and 4B show an example of the printed coil to be employed in a linear actuator to which the invention can be applied. More than one spiral conductor patterns 3, thru-hole lands 4 and external electrode portions (pads) 7, respectively are aligned in juxtaposition on or along a linear line which coincides with the sliding direction. In the case of the embodiment illustrated in FIGS. 4A and 4B, a pair of spiral conductor patterns are juxtaposed with each other. A desired number of thru-holes 6 may be formed for establishing electrical connection between the spiral conductor patterns formed on both side surfaces of the interposed coil carrier or substrate 2, as in the case of the flat brushless motor shown in FIGS. 3A-3C. The printed coil carrier member 2 may be made of any electrically insulating material and constituted, for example, by a glass epoxy substrate, polyimide film, epoxy resin film or the like. Of couse, any suitable method may be adopted for forming the thru-hole 6.

Figure 5A:
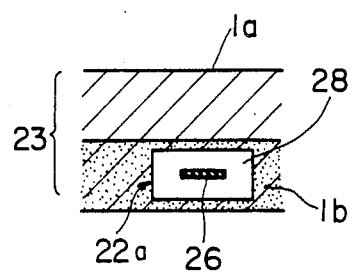
FIGS. 5A and 5B illustrate, respectively, in schematic sectional views, two examples of a construction in which a magnetic sensor element is embedded or buried in a printed coil unit according to the present teaching of the invention.
Figure 5B:
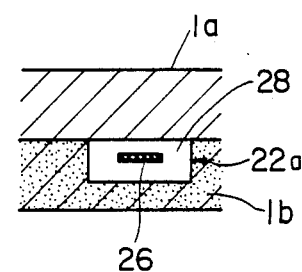

A magnetic detector or sensor element such as 22 in FIGS. 5A-5B is embedded in the carrier at the same plane as the printed coil sheets constituted a coil unit. With the phrase "embedded at the same plane", it means that an intrinsic magneto-sensitive portion 26 of the magnetic sensor element is positioned within a range defined by the thickness of the simplex sheet or layer 1a or 1b of the printed coil unit while a mold portion 28 of the magnetic sensor element does not project beyond the exposed surface of the single or laminated printed coil carrier member, as is illustrated in FIGS. 5A and 5B.

Figure 5C:
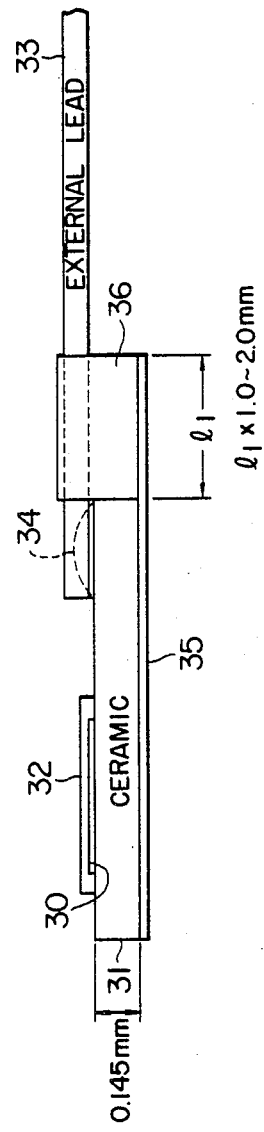
FIGS. 5C and 5D show, respectively, the examples of an embedded magnetic sensor element of FIGS. 5A and 5B in section.
Figure 5D:
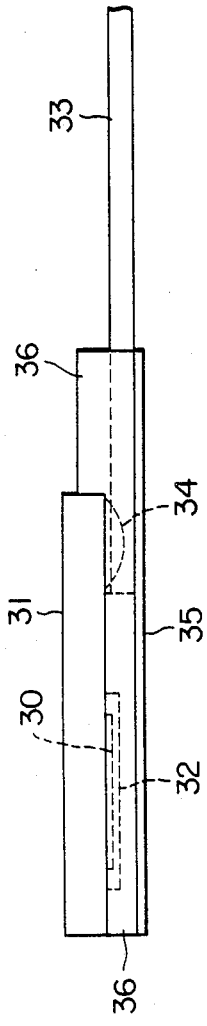

In order that the magnetic sensor element is to be embedded within the printed coil unit, the thickness of the magnetic sensor element should desirably be less than 0.6 mm at most. Although the thickness of the magnetic sensor element may be selected rather arbitrarily, it should be smaller than that of the printed coil carrier member within which the element is embedded. So far as the thickness of the magnetic sensor element is smaller than that of the printed coil unit, there arises no necessity for deforming the spiral conductor patterns of the printed coils on account of the position and configuration of the magnetic sensor element except for the printed coil within which the element is embedded, whereby freedom in design of the spiral conductor pattern is increased. In this connection, the magnetic sensor element disclosed in Japanese Patent application No. 59-193272 filed Sept. 14, 1984 and assigned to the present assignee and Asahi Kasei Denshi Co., Ltd. can be employed advantageously in carrying out the invention. More specifically, as illustrated in FIGS. 5C and 5D by way of two examples, the magnetic sensor element should preferably be constituted by a thin Hall element which is mounted on a supporting plate 35 such as polyimide film by bonding, at the location of solder bump 34, leads 33 extending in parallel from the surface of a thin film semiconductor (pellet) 31 which constitutes a planar magneto-sensitive (e.g. InSb) portion 30 of the Hall element adjacent to a protective epoxy resin layer 32, which leads can be connected to terminals (not shown) for external connection. The lead 33 and support plate 35 are fixedly connected to each other by an adhesive 36 such as epoxy resins and acrylic resins. As a method of fabricating a very thin magnetic sensor element such as Hall element, a thin semiconductor film of InSb, for example, may first be formed to a thickness of several microns through vapor deposition on a ceramic substrate having a thickness less than 250 $\mu$m, which is followed by patterning the thin semiconductor film in a desired geometry through a photoetching process. Subsequently, leads of a strip-shaped form are connected to the terminal portions of the semiconductor thin film by soldering in such a manner that the leads extend in parallel with the planar substrate. For further particulars, reference may be made to U.S. Pat. No. 4,251,795, FIGS. 3c and 4 and U.S. Pat. No. 4,296,424, FIGS. 6 to 10, both being assigned to the present assignee. The magnetic sensor element mentioned above can be easily manufactured to a thickness less than 0.6 mm. Moreover, no substantial difficulty will be encountered in forming the sensor element with a thickness smaller than 0.4 mm. The sensor element may be of any geometrical configuration. However, when the sensor element is to be disposed in a region which is made available by deforming the spiral conductor patterns at the corners thereof, the sensor element should preferably be of a wedge shape such as a pentagonal form or more preferably of a triangular form, as is illustrated by 8 in FIGS. 7A-7D. Such sensor shape is advantageous in permitting easy and exact mounting of the element into a restricted area of the coil sheet 9.

As the magnetic sensor element, any type of element which can provide the function of converting the variation or change in the magnetic field into an electric signal may be employed. As typical ones, there may be mentioned Hall elements, magnetic resistance elements or the like.

When a plurality of the magnetic sensor elements are to be employed, it is preferred that all the elements be embedded within one of the printed coil sheets which constitute a coil unit, because then the distance from a magnet to the various individual magnetic sensor elements can be made constant, which in turn means that the intensity of the magnetic field sensed by the individual sensor elements is uniform among these sensor elements. Further, since holes for receiving all the magnetic sensor elements can be formed at the same time by using a die, the plurality of the magnetic sensor elements can be embedded with an improved accuracy in their relative positions. As a consequence, the switching of the current supply to the individual coils can be effected with more accurate timing, whereby nonuniformity in rotation of a small size motor or nonuniformity in thrust of a linear actuator to which the invention is applied can be kept to a minimum.

Figure 6A:
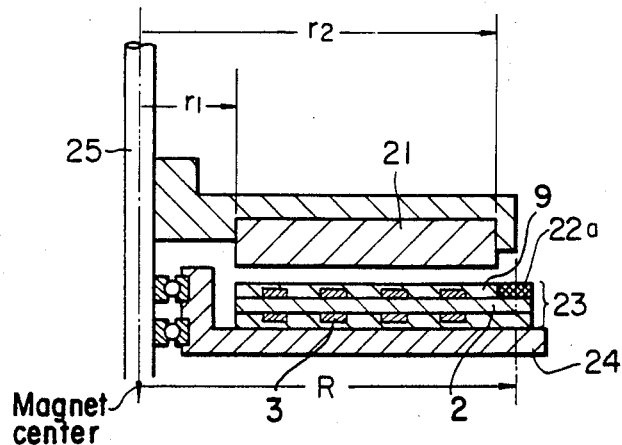
FIG. 6A is a sectional view showing partially a structure of a flat brushless motor incorporating a magnetic sensor element and constructed in accordance with the present invention.
Figure 6B:
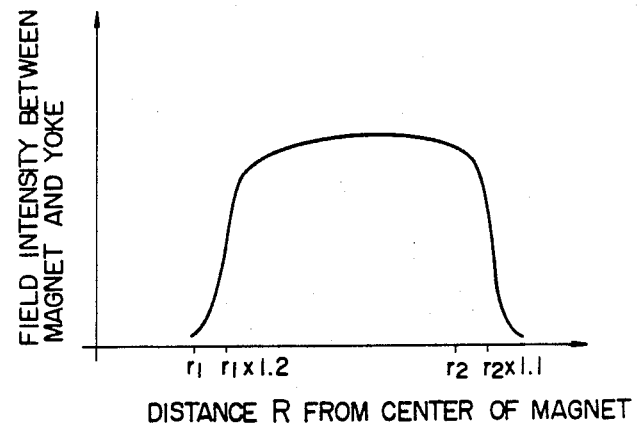
FIG. 6B is a view for graphically illustrating the relationship between magnetic field intensity and distance from the center of the flat brushless motor of FIG. 6A.

Further, it is preferred that the printed coil sheet having the magnetic sensor element embedded therein be disposed at a location nearest to the magnet disposed in opposition thereto. In this case, the magnetic sensor element is subjected to a magnetic field of high intensity, resulting in a high output signal of the magnetic sensor element, whereby more accurate timing at which the coil current is switched can be assured. In the case of a coil unit substrate on which a plurality of multilayer printed coils (sheets) are disposed in alignment with one another, at least one coil pattern of the printed coil layer or sheet located closest to the magnet may be diminished in size as compared with the other coil patterns, wherein the magnetic sensor element is embedded or buried in the area resulting from the reduced coil pattern. In this way, part of the reduced coil pattern which plays in generating torque is reduced to thereby balance the contribution of the individual printed coils to the generation of torque in cooperation with the magnet. This is advantageous in that unevenness of torque (or unevenness of thrust in the case of a linear actuator) can be reduced. By way of example in conjunction with FIGS. 6A–6C, in a flat brushless motor including a rotor magnet having four N poles and four S poles in combination with the printed coils corresponding to eight poles, it is assured that a coil corresponding to one pole is diminished in size with the number of turns being correspondingly decreased. Even in such a case, the rotational force or moment of the rotor magnet is determined by a combined action of eight coils while the force applied to the magnet is always constant due to the balance of field intensities applied to the laminated coils of different axial distances from the magnet. Consequently, uniformity of rotation of the magnet rotor can be assured. In the case of a flat brushless motor, the position or location on the printed coil where the magnetic sensor element is to be embedded should preferably fulfil simultaneously the two conditions mentioned below. The first condition is given by $r_1 \times 1.2 \leq R \leq r_2 \times 1.1$ or more preferably by $r_1 \times 1.4 \leq R \leq r_2 \times 1.0$ where $r_1$ and $r_2$ represent inner and outer diameters, respectively, of a magnet 21, and R represents the distance between the center of the magnet and the center of the intrinsic magneto-sensitive portion of the magnetic sensor element. FIG. 6B graphically illustrates this relationship between the distance from the center of the motor and intensity of the magnetic field. Unless the distance R satisfies the above condition, the accuracy at which the position of the magnet is detected will be degraded. In the present specification, the phrase "intrinsic magneto-sensitive portion" means a magnetically active part or portion of the magnetic sensor element, such as 22 in FIGS. 5A–5B, 22a which converts an intensity of the magnetic field into an electric signal. The second condition imposed on the location where the magnetic sensor elment 22a is embedded resides in that the element should be embedded in the area which is not covered by the spiral conductor pattern 3 and the center region 5 thereof. More specifically, the magnetic sensor element should be embedded in the region located between the adjacent spiral conductor patterns or at regions located in the vicinity of the outer or inner periphery of the coil carrier or substrate disc. The number of the magnetic sensor elements as employed may amount to more than two depending on the driving method adopted. In that case, the pitch of the circumferential magnetic sensor element array does not usually coincide with that of the spiral conductor pattern array. In reality, even when one magnetic sensor element can be disposed in a blank space between the adjacent spiral conductor patterns, there may arise such a situation that another magnetic sensor element or elements are forced to be embedded at the location covered by the spiral conductor pattern. In the latter case, a particular spiral pattern is formed so as to make available a space where the magnetic sensor element can be embedded without being covered by the conductor pattern although the torque produced by the resulting pattern is somewhat reduced. Such arrangements of the magnetic sensor elements are illustrated in FIGS. 7A to 7D.

Figure 7A:
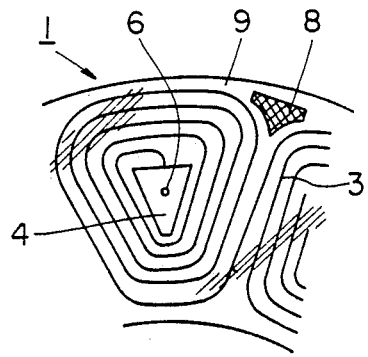
FIGS. 7A to 7D are fragmental plan views showing four examples of coil units constructed in accordance with the present invention, for illustrating positional relationships between a magnetic sensor element and the spiral coil conductor patterns formed on a disc-like coil sheet.
Figure 7B:
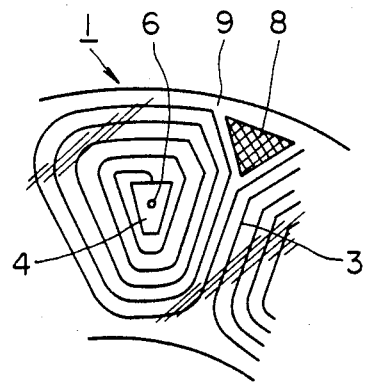
Figure 7C:
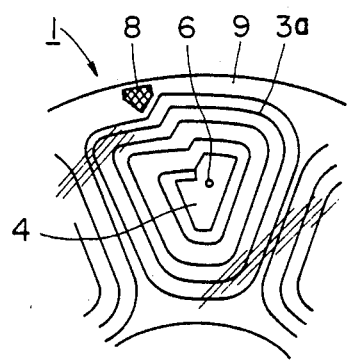
Figure 7D:
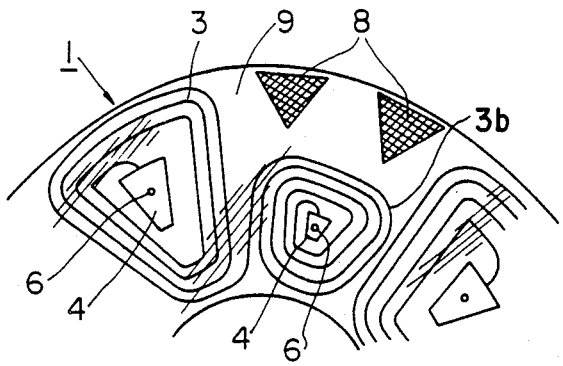

In FIG. 7A, a pentagonal magnetic sensor element 8 is arranged in a space between the spiral coil patterns 3 and the outer periphery of the sheet 9 such that the element may have two arcuate arms confronting with the outer shape of the coil patterns. FIG. 7B shows a modification of FIG. 7A in which the adjacent coil patterns define a triangular space therebetween and a triangular magnetic sensor element 8 is disposed in the space. FIGS. 7A and 7D indicate other aspects in which the element 8 needs to be disposed in other spaces on the sheet 9 than that between the coil patterns, as stated previously, and the spaces are formed by partially modifying one coil pattern 3a or 3b in a shape smaller than the other coil patterns. In FIG. 7C, one magnetic sensor element is disposed and in FIG. 7D, two sensor elements are disposed.

Figure 8A:
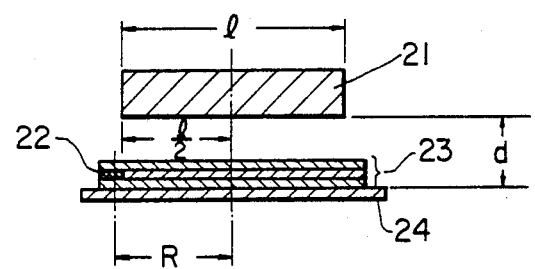
FIG. 8A is a schematic sectional view of a linear actuator constructed in accordance with the present invention and incorporating a magnetic sensor element.
Figure 8B:
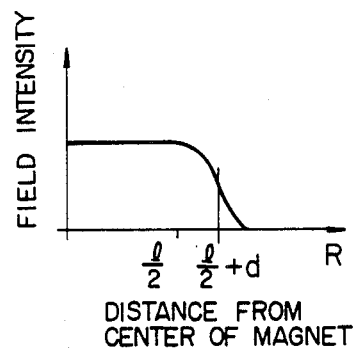
FIG. 8B is a view for graphically illustrating the variation of field intensity as a function of distance from the center of the magnet in the linear actuator of FIG. 8A.

In the case of a linear actuator as shown in FIG. 8A, the location at which the magnetic sensor element 22 is allowed to be embedded also should satisfy two conditions simultaneously. One of the conditions is given by $R \leq (l/2)+d$ and more preferably by $R \leq (l2)+0.5 \times d$, where R represents the distance between the center of the magnet as viewed widthwise and the center of the magneto-sensitive portion of the magnetic sensor element, and d represents the distance between the magnet and the coil, as will be seen from FIG. 8B which graphically illustrates a relation between the distance from the center of magnet and the magnetic field intensity. At location where R is greater than $(l/2)+d$, the magnetic field intensity is too weak to assure high accuracy in the detection of the position of the magnet. Again, the magneto-sensitive portion or active part of the sensor element means an effective portion capable of actually converting a magnetic field intensity into an electric signal. In this connection, it is important from the standpoint of the magnetism-detecting function to determine the distance R with reference to the center of the active part of the magnetic sensor element. FIG. 8A indicates a section of the linear actuator taken in parallel to a magnetic force produced from the magnet 21 and perpendicular to the sliding direction of a movable part. The magnetic force emanating from the N-pole of the magnet 21 travels in parallel to the plane of the drawing sheet and perpendicularly to the plane of the coil unit 23, and subsequently through the yoke plate 24 and coil unit 23, into the S-pole of the magnet 21. The second condition imposed on the location where the magnetic sensor element is embedded resides in that the region of the spiral conductor patterns 3 as well as the center area thereof be excluded as a possible location cite. The magnetic sensor element 8 should be disposed between the adjacent spiral conductor patterns or at the region located in the vicinity of the outer periphery of the coil carrier or sheet 9, as will be seen in FIG. 9A.

Figure 9A:
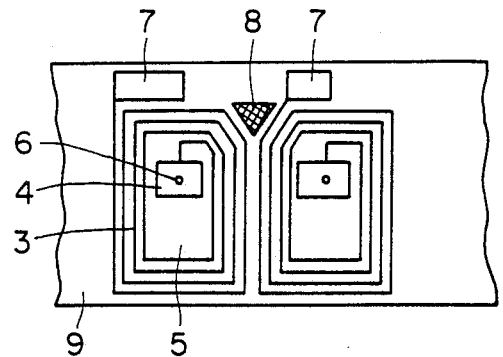
FIGS. 9A and 9B are fragmental plan views illustrating positional relationships between magnetic sensor element(s) and spiral conductor patterns in a linear actuator constructed according to the invention.
Figure 9B:
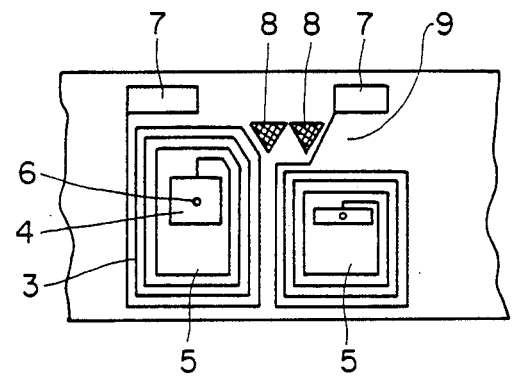

FIG. 9A indicates an example of a linear actuator in which one magnetic sensor element 8 is disposed in a space defined by corners of adjacent spiral-coil patterns 3 on the sheet 9, and FIG. 9B is a modification thereof in which one of the adjacent coil patterns 3 is slightly reduced in shape and an additional magnetic sensor element 8 is disposed in a space formed by the reduction of coil pattern. The general structure of actuator coil is similar to that of FIGS. 4A and 4B.

Figure 10:
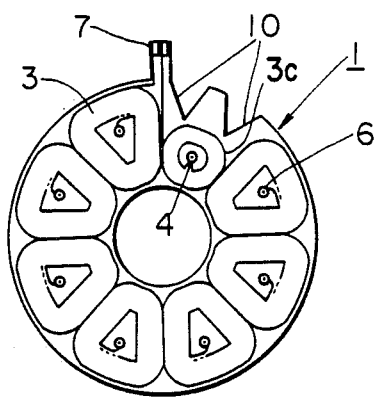
FIG. 10 is a plan view of a printed coil sheet punched by a die in an annulus form so as to have an outer diameter and an inner diameter as well as V-shaped notches for securing therein in accordance with the present invention, magnetic sensor elements.

For embedding the magnetic sensor element in the printed coil carrier, holes for receiving the sensor elements are formed in the printed coil carrier or substrate, for example, by a press. The sensor element disposed within the hole is then fixedly secured by a bonding agent. The shape of the hole should preferably match that of the configuration of the magnetic sensor element for attaining a high positional accuracy. In the case where the magnetic sensor element to be employed is of a triangular shape, a V-shaped notch which conforms with the shape of the sensor element should preferably be formed through the same process of forming the printed coil carrier by means of a die. The sensor element of the triangular shape is then placed within the V-shaped notch and secured by a bonding agent as illustrated in FIG. 10. In FIG. 10, eight spiral-coil patterns are arranged around the same circle on a sheet 9 such that a current supplied from an input terminal 7 passes successively through the eight coil patterns into an output terminal 7. The coil disc comprises two V-notches 10 for accommodating triangular sensor elements in a space outside one reduced coil pattern 3c. In connection with the punching formation of the V-shaped notch for receiving the sensor element, it is preferred to inscribe a positioning mark in the photomask used for forming the printed coil for assuring a positional accuracy of the magnetic sensor element relative to the printed coil.

In the case of a rotary actuator or a linear actuator, it is preferred to provide a FG coil in coplanar form in the printed coil carrying member for detecting the moving speed of a movable part of the actuator. The FG coil is generally constituted by a meandering pattern (see pattern 11 in FIGS. 11A to 11C) including line segments extending perpendicular to the direction in which the magnetic poles or the coil unit is moved and having ends connected alternately. The FG coil serves to generate a signal containing a frequency component representative of the aforenoted moving speed.

Figure 6C:
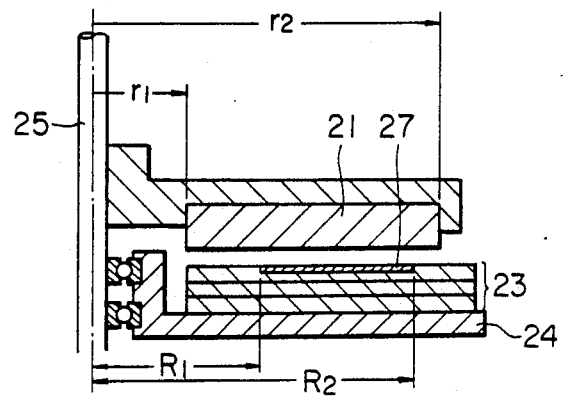
FIG. 6C is a view similar to FIG. 6A and shows a flat brushless motor incorporating a FG coil and constructed in accordance with the present invention.

Description will be made of a flat brushless motor with reference to FIG. 6C, by way of example.

The location where the FG coil 27 is to be installed should satisfy two conditions mentioned below.

The first condition is that the FG coil be located within a range defined by $r_1 \times 1.2 \leq R \leq r_2 \times 1.1$ and more preferably by $r_1 \times 1.4 \leq R \leq r_2 \times 1.0$, provided that $r_2 > (12/11)r_1$, where $r_1$ and $r_2$ represent inner and outer diameters, respectively, of a magnet 21, and R represents the distance from the center of the magnet 21 (i.e. the position of shaft 25), (see FIG. 6C), to the center of FG coil 27. FIG. 6B graphically illustrates the result of experimentally established relationship between the distance from the center axis of a motor shaft 25 and the magnetic field intensity. $R_1$ and $R_2$ represents the distances of the FG coil near and remote from the center axis 25, respectively. It should, however, be noted that the FG coil is not necessarily enclosed completely within the range defined above. Terminals and end portions of the FG coil may extend out of the range without departing from the scope of the invention. In FIGS. 6A, 6B and 6C, a reference numeral 24 denotes a stationary yoke plate and 23 denotes a printed coil unit mounted on the yoke plate 24.

When the distance R defined above is excessively small, the magnetic field is correspondingly feeble and degrades the accuracy at which the rotational speed of the motor is detected by the FG coil.

The second condition imposed on the location of the FG coil is that the region in which the FG coil is installed must not be covered by the spiral conductor pattern 3 and the center area 5 thereof. The FG coil should be disposed between the adjacent spiral-conductor pattern or in a region located along the inner or outer periphery of the coil carrier. In each of FIGS. 11A-11C, eight spiral-coil patterns 3 are arranged on the same circular plane and a current applied from an input terminal 7 successively passes through the coil patterns connected to one another into another output terminal 7. An output of FG coil 11 is taken out across terminals 8 and 12.

FIG. 11A is a top plan view showing an FG coil 11 disposed in a gap between the adjacent coil patterns 3, while FIG. 11B shows in a plan view an FG coil 11 disposed in an outer peripheral region enclosing the circular array of the spiral conductor patterns 3.

For obtaining a sufficiently high output voltage from the FG coil, the latter may be located not only between the adjacent conductor patterns but also in a region made available by deforming partially the spiral coil pattern.

FIG. 11C shows an exemplary embodiment of the invention in which the spiral conductor patterns 3 are partially deformed so as to make available a space where the FG coil 11 is disposed.

Figure 12A:
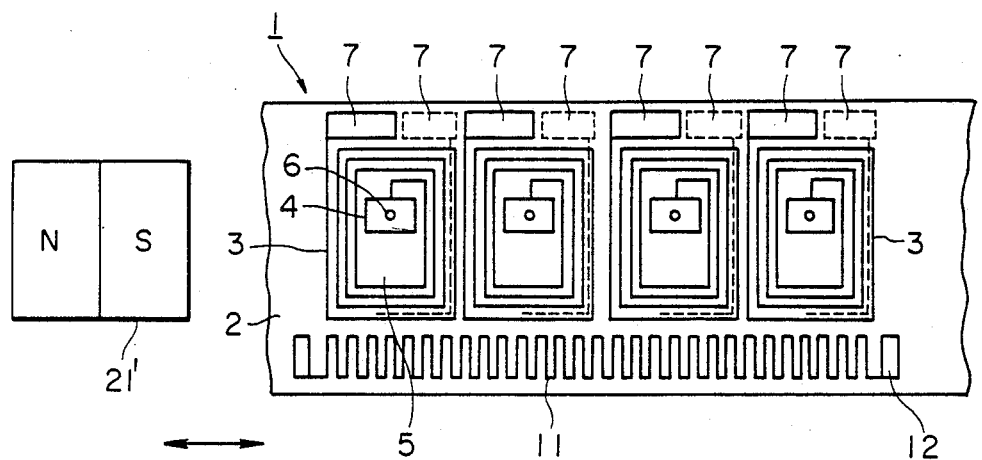
FIGS. 12A and 12B show in a plan view and a sectional view a positional relationship between an FG coil and spiral coil conductor patterns in a linear actuator made in accordance with the present invention, and the structure of the latter, respectively.
Figure 12B:
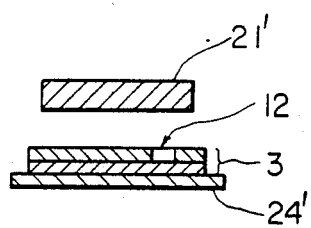

In the case of a linear actuator, it is also preferred to provide the FG coil on the same substrate carrying the printed coils. The location at which the FG coil is disposed should satisfy the conditions described hereinbefore in conjunction with FIGS. 8A and 8B. The FG coil must be located in regions exclusive of the spiral conductor patterns 3 and the center areas thereof. More specifically, the FG coil should be located between the adjacent spiral conductor patterns or in a region extending along an edge of the coil carrier, as is shown in FIG. 12A. FIG. 12B indicates the positional relationship between a magnet 21' and a printed coil unit 1 mounted on a carrier 24'.

For forming the FG coil, a region where the FG coil is to be mounted is prepared simultaneously with fabrication of the printed coil including the spiral coil patterns and subsequently the FG coil is formed in that region. Alternatively, the FG coil may be formed simultaneously with the spiral conductor pattern through the same process mentioned hereinbefore. From the viewpoint of the positional accuracy, it is preferred to form the FG coil simultaneously with the spiral-conductor coil patterns.

Further, the FG coil may be incorporated in the same printed coil sheet as the magnetic sensor elements is embedded. Of course, the FG coil may be implemented on a coil sheet made in accordance with the present invention but having no magnetic sensor elements.

Figure 13A:
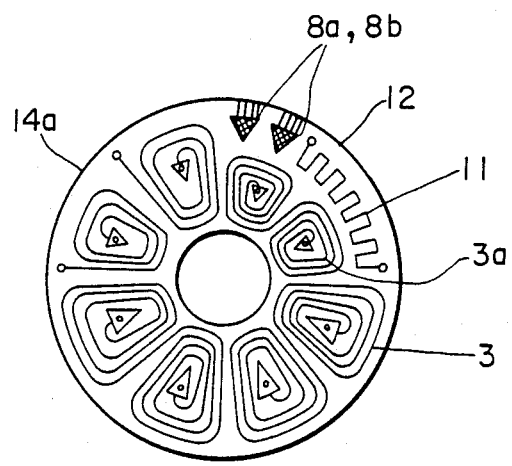
FIGS. 13A and 13B show in plan views a pair of printed coil sheets coonstituting a printed coil unit for a flat brushless motor made in accordance with the present invention, and illustrating positional relationships among the magnetic sensor elements, FG coil and spiral coil conductor patterns.
Figure 13B:
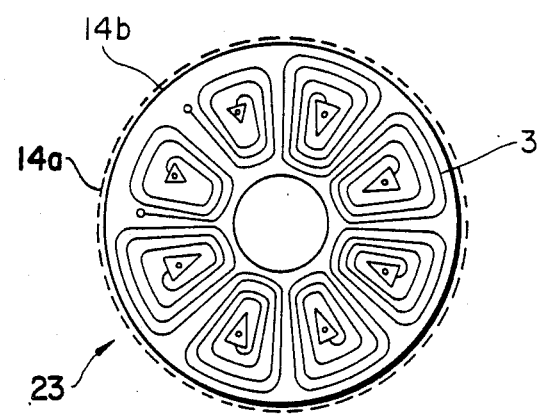

FIGS. 13A and 13B show exemplary embodiments of a flat brushless motor in which the FG coil is incorporated in combination with the Hall elements serving as the magnetic sensor element. More particularly, FIG. 13A shows in a plan view those of the laminated printed coils which are located closest to the rotor magnet. As will be seen, there are disposed on the disc-like printed coil unit 14a spiral conductor patterns 3 of a large size, spiral conductor patterns 3a of a reduced size, Hall elements 8a and 8b and a FG coil pattern 11 located in the region defined by the outmost turn of the spiral conductor patterns 3 and the outer periphery of the coil unit. FIG. 13B shows in a plan view a coil array 14b of the laminated coil unit which is axially remoted from the magnet. The disc-shaped printed coil array 14b is fabricated in the manner described hereinbefore in conjunction with FIGS. 3A and 3B and stacked or laminated on the coil array 14a to constitute a printed coil unit 23.

A plurality of the printed coil sheets prepared in the manner described above and having the magnetic sensor element embedded therein are fixedly stacked or laminated mutually or in combination with those incorporating no magnetic sensor element to thereby constitute a coil unit. Alternatively, the simplex printed coil sheet having the magnetic sensor element embedded may be used, if the application allows it. For fixed lamination of the coil sheets, any type of bonding agent may be used so far as electrical insulation can be assured among the coil sheets. For example, bonding agents of epoxy resins or phenol resins may be used to this end. Alternatively, a bonding sheet having both surfaces applied with a bonding agent in a semihardened state may be used to secure together the printed coil sheets.

In the following, the invention will be described in conjunction with practial Examples; however, it should be understood that the invention is not restricted to these Examples.

EXAMPLE 1

Figure 14A:
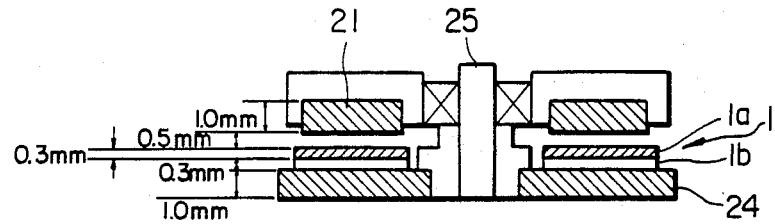
FIGS. 14A, 14B and 14C and FIGS. 15A, 15B and 15C are sectional views and plan views for illustrating structures of flat brushless motors according to first and second practical examples of the invention, respectively.
Figure 14B:
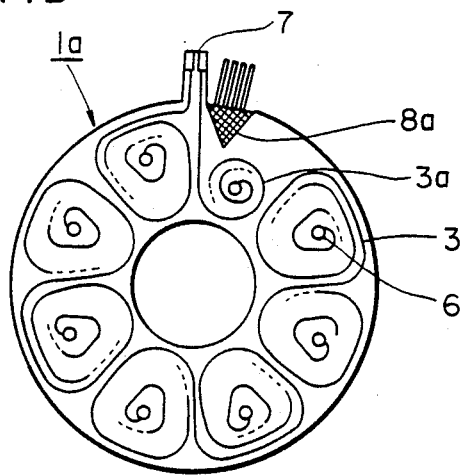
Figure 14C:
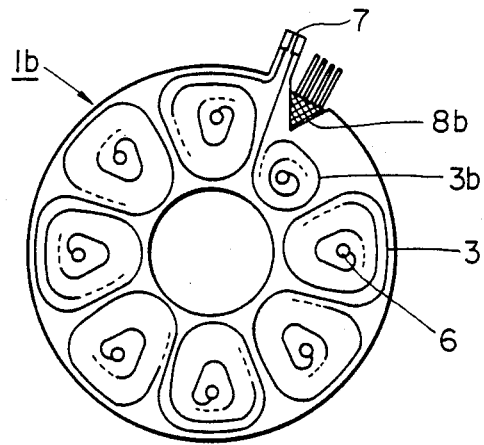

Referring to FIGS. 14A to 14C, the first example will be described.

Eight spiral conductor patterns (3, 3a, 3b) were formed on each side of a flat insulation substrate in an annular array having an outer diameter of 20 mm and an inner diameter of 7 mm in sectors each having an apex angle of 45° by using photo-lithography and copper electroplating techniques, whereby two coil sheets were prepared. In each of the coil sheets (1a, 1b), one of the reduced size patterns 3a, on each surface of the printed coil sheet to provide a region in which a Hall element is to be embedded, in accordance with the patterning process. Each full size coil pattern 3 was produced with outer and inner diameters of 20 mm and 7 mm, respectively, while the reduced coil patterns 3a and 3b each had 15 mm and 7 mm outer and inner diameters, respectively. In the respective sheets, the spiral conductor patterns were disposed in opposition to each other with the insulation layer interposed therebetween, and were electrically connected by way of thru-holes 6 formed at the coaxial center of both the patterns. Further, adjacent conductor patterns on the same surface of the insulation layer were wound in directions opposite to each other. Finally, an insulation coat was applied over each of surfaces of the printed coils. The finished printed coil sheet was 0.3 mm thick inclusive of thickness of the coat layers.

Subsequently, the printed coil sheets initially formed on the same insulation substrate were cut separately in the form of a flat doughnut-shape by means of a pushback type die relative to a positioning mark preformed in the photomask. At that time, a notch of a regular triangular form was simultaneously formed to receive therein a respective Hall element 8a, 8b of a regular triangular form having a side of 2.3 mm in length and a thickness of 0.3 mm. The notch was configured and located so that the Hall element could be embedded with the magneto-sensitive portion of the element located at a distance of 9 mm from the center axis of the coil.

A yoke plate 24 was formed by cutting a silico-steel sheet material of 1 mm in thickness, and in both-side adhesive bonding sheet having a polyethylene glycol terephthalate film base of 42 μm in thickness, which was commercially available from Nitoh Denko corporation in Japan under the trade name "NITOFIX TK-2532", was applied over the yoke plate 24. Subsequently, the printed coil sheet 1b was placed thereon with the Hall element being inserted in the notch without projecting from the coil surface nor being depressed below the coil surface. Further, the adhesive bonding sheet mentioned above was applied over the now mounted coil, and subsequently the second printed coil sheet 1a was placed on the first coil sheet 1b with an angular displacement of 22.5° to the latter, while the Hall element 8a being fitted in the triangular notch in the manner mentioned above. A laminated structure thus prepared was held under pressure by a heating press at a temperature of 120° C. under a pressing load of 10 Kg/cm² for an hour.

The laminated structure of the coil unit 1 and the yoke plate 24 thus prepared were positioned with a gap of 0.5 mm in a face-to-face opposing relationship to a magnet 21 of 1 mm in thickness and having outer and inner diameters of 19 mm and 8 mm, respectively. The magnet 21 is made of a sintered rare-earth element magnet (samarium cobalt 2-17 series having maximum Every product of 20 mega Oersteds) and magnetized in the direction perpendicular to the planar surface so that four N-poles and four S-poles appear alternately on the facing surface. The coil unit 1 and the magnet 21 were mounted on a rotatable shaft 25 (FIG. 14A). The assembly thus produced had a gap of 1.1 mm between the magnet and the yoke plate. The brushless motors were assembled by using the structure described above.

The motor thus assembled and to be tested was rotated by another motor at a predetermined angular speed. Concurrently, the counter electromotive force or voltage was measured for both coils. It was found that the sum of the counter electromotive voltages indicative of overall torgue of the motor being tested was 2.08 volts at a rotational speed of 2400 r.p.m. on an average over ten motors. Further, the difference in the counter electromotive voltage between the two printed coils which indicates a difference in contribution to the motor torgue between both the coils was 0.174 volts on an average over ten motors thus fabricated.

In the course of measurements of the voltages mentioned above, a current of 5 mA was supplied to the Hall elements and the inter-peak voltage of the output signals thereof was measured. It was found that the output voltage of the Hall element mounted on the coil located near to the magnet was 280 mV on an average over ten motors, while that of the other Hall element was 248 mV. The angle between the center axes of the Hall elements as calculated on the basis of the phase difference of the output waveforms fell within 22.5±0.3° in all of motor samples.

EXAMPLE FOR COMPARISON

Figure 16A:
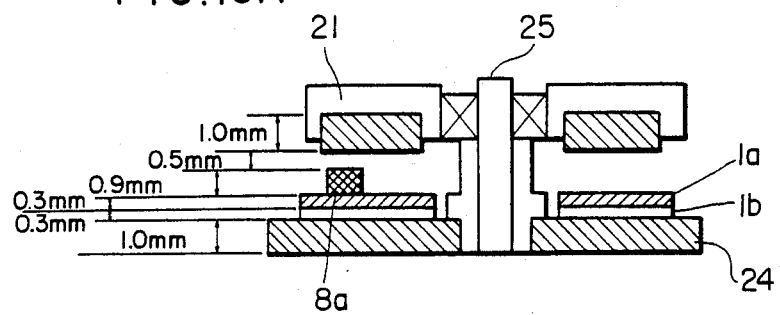
FIGS. 16A to 16C are, respectively, sectional views and plan views for illustrating the structure of a flat brushless motor employed for the purpose of comparison with the flat brushless motors acording to the examples of the invention.
Figure 16B:
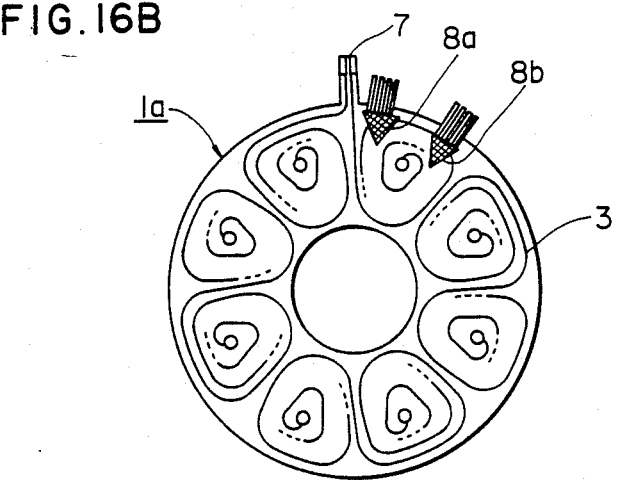
Figure 16C:
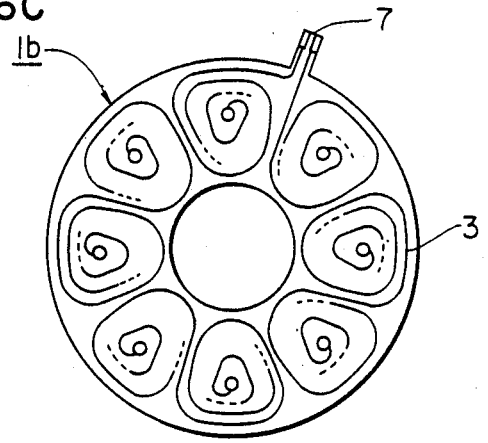

Three flat brushless motors were manufactured with the same structure as that of Example 1 except that a pair of Hall elements 8a, 8b of a regular triangular form having a side length of 2.3 mm and a thickness of about 0.9 mm were fixedly mounted on the spiral conductor pattern 3 constituting one pole of the printed coil located near to the magnet by using a cyano-acrylate based flash-bonding agent available commercially under the trade name "TAKPAK" from Nippon Locktight Company in such an arrangement that the magneto-sensitive portions of the Hall elements were spaced from the center axis by 9 mm with an angular displacement of 22.5° as measured between the center axes of the elements. In all the motors as fabricated, the gap between the magnet and the yoke plate was 2.0 mm (FIGS. 16A to 16C).

In the evaluation of the characteristics of the three comparative motors, the sum of the counter electromotive voltages of both printed coils was found to be 1.49 V on an average over three motors at a rotational speed of 2400 r.p.m.

In the course of the above measurement, a current of 5 mA was supplied to the Hall elements and inter-peak voltages of both Hall elements were measured. On an average over three motors, the output voltages of both Hall elements were 240 mV and 243 mV, respectively. The angles between the center axes of the two Hall elements calculated on the basis of phase differences of the output waveforms were 21.8°, 22.6° and 23.1° in the three motors, respectively.

EXAMPLE 2

Figure 15A:
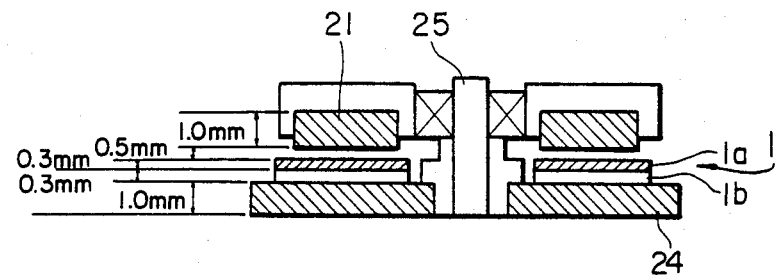
Figure 15B:
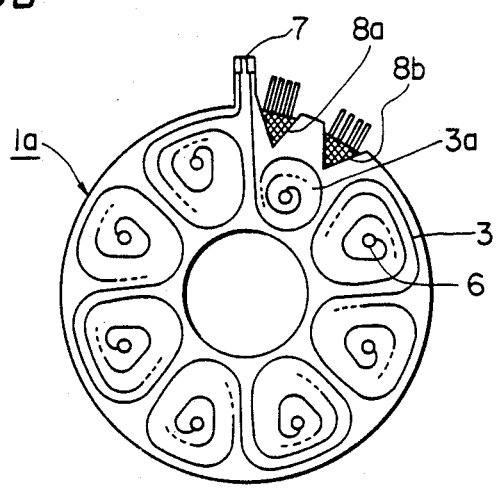

Referring to FIGS. 15A to 15B, the second example will be described.

Figure 15C:
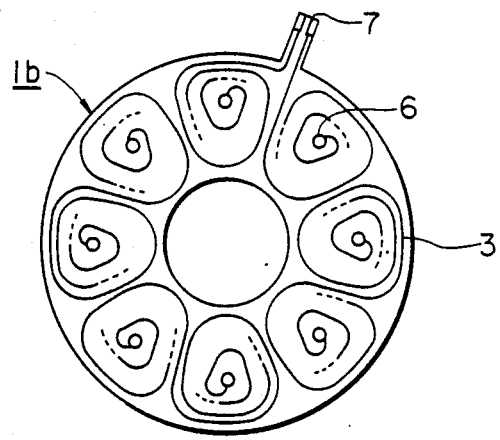

Through photolithography and a copper electroplating process using a photomask, a set of two printed coils (sheets 1a, 1b) having spiral conductor patterns differing from each other were formed on both surfaces of an interposed insulation layer in a flat annular or doughnut-shaped array having outer and inner diameters of 20 mm and 7 mm, respectively. The patterns were located in sectors each having an apex angle of 45° so that eight poles appear on each of the printed (1b in FIG. 15C) coil sheets 1a and 1b (FIGS. 15B and 15C). One of the printed coil sheets was composed of the spiral conductor patterns of eight poles arrayed uniformly, while in the other spiral coil sheet 1a, a selected one (3a) of the spiral conductor patterns on each side was reduced in size to make available a region along an outer periphery of the reduced conductor pattern, where a plurality of Hall elements 8a, 8b were to be embedded (FIG. 15B). The spiral conductor patterns 3 disposed in opposition to each other with the insulation layer interposed therebetween were electrically connected by way of thru-holes 6 formed at the coaxial center of both the patterns. Further, adjacent conductor patterns on the same surface of the insulation layer were coiled in directions opposite to each other. Finally, an insulation coat was applied over each of the surfaces of the printed coils. Each of the finished printed coil sheets was 0.3 mm thick inclusive of the thickness of the coat layers.

Subsequently, the printed coil sheets initially formed on the same insulation substrate were cut separately in the form of a flat doughnut-shape by means of a push-back type die with respect to a reference of a mark performed on the photomask. At the time, notches each of a regular triangular form were simultaneously formed in the printed coil sheet 1a to receive therein two Hall elements, respectively, of a regular triangular shape having a side of 2.3 mm in length and a thickness of 0.3 mm. The Hall elements were embedded at such a position that the magneto-sensitive portion of the element was located at a distance of 9 mm from the center axis of the coil, both Hall elements being angularly displaced at an angle of 22.5° as measured between respective center axes.

A yoke plate 24 was formed by cutting a silico-steel sheet material of 1 mm in thickness, and an adhesive bonding sheet of 42 μm in thickness, which was commercially available from Nitoh Denko corporation in Japan under the trade mark "Nitofix TK-2532", was applied over the yoke plate 24. Subsequently the first printed coil sheet 1b was placed thereon, the adhesive bonding sheet mentioned above was applied over the now mounted coil sheet, and then the second printed coil 1a was placed on the first coil sheet 1b with an angular displacement of 22.5° to the latter, while the Hall elements were fitted in the triangular notches of the printed coil sheet 1a in the manner mentioned above. A laminated structure thus obtained was held under pressure by a heating press at a temperature of 120° C. under a pressing load of 10 Kg/cm² for an hour.

The laminated structure of the coil unit 1 and the yoke plate 24 thus prepared was positioned with a gap of 0.5 mm in a face-to-face opposite relationship to a magnet of 1 mm in thickness and having outer and inner diameters of 19 mm and 8 mm, respectively. The magnet was made of a sintered rare-earth element magnet (samarium cobalt 2-17 series having maximum energy product of 20 mega Oersteds) and magnetized in the direction perpendicular to the planar surface so that four N-poles and four S-poles appear alternately in sectors divided by 45° in the circumferential direction. The coil unit and the magnet were mounted on a rotatable shaft 25, as shown in FIG. 15A in a sectional view. The assembly thus produced had a gap of 1.1 mm between the magnet and the yoke plate. Ten brushless motors were assembled by using the structure described above. that the sum of the counter electromotive voltages was 2.09 volts at the rotational speed of 2400 r.p.m. on an average over ten motors. Further, the difference in the counter electromotive voltage between the two printed coils was 0.038 volts on an average over ten motors.

In the course of the measurement of the voltages mentioned above, a current of 5 mA was supplied to the Hall elements and the inter-peak voltage of the output signals thereof was measured. It was found that the output voltages of the Hall elements were 288 mV and 279 mV, respectively, on an average over ten motors.

Further, the angle between the center axes of the Hall elements as calculated on the basis of the phase difference of the output waveforms fell within 22.5±0.3° in all of ten motors.

We claim:

1. A printed coil unit for an actuator of a small size comprising at least one printed coil sheet having opposed planar surfaces separated by a defined thickness; a magnet magnetized so as to present at least one magnetic pole in a given plane, said printed coil sheet being disposed in opposition to said magnet and having at least one spiral conductor pattern deposited in said plane, wherein at least one magnetic sensor element having a thickness smaller than said defined thickness of said printed coil sheet, is formed in a region of said printed coil sheet located in the vicinity of and outside of said spiral conductor patterns, said magnetic sensor element being confined within the exposed surfaces of said printed coil sheet.

2. The printed coil unit for an actuator of a small size according to claim 1, wherein a plurality of said magnetic sensor elements are all embedded in said printed coil sheet, said magnetic sensor elements being positioned at substantially the same distance from an opposed surface of said magnet.

3. The printed coil unit for an actuator of a small size according to claim 2 and having a plurality of said printed coil sheets, wherein all of said magnetic sensor elements are embedded in the printed coil sheet positioned most closely to said magnet.

4. The printed coil unit for an actuator of a small size according to claim 1, the actuator being a flat brushless motor, wherein said magnet serves as a rotor and has an axis of rotation, said magnet being of a flat annular shape and magnetized in a direction perpendicular to the axis of said magnet so as to present n N-poles and n S-poles in paired relation, said magnet having an inner diameter $r_1$ and an outer diameter $r_2$; wherein each of said printed coil sheets having a row of 2n spiral conductor patterns disposed in an annular array in correspondence to said n pairs of S- and N-poles; and wherein said printed coil sheet has said magnetic sensor element embedded in a region outside of said spiral conductor pattern at such a position that a magneto-sensitive portion of said element lies at a distance R given by $r_1 \times 1.2 \leq R \leq r_2 \times 1.1$ from the center of said magnet.

5. The printed coil unit for an actuator of a small size according to claim 1, the actuator being a linear slidable actuator, wherein said magnet has a width in the direction perpendicular to the slidable direction of said actuator, said printed coil sheet including a plurality of said spiral conductor patterns aligned in said slidable direction, said magnetic sensor element being embedded at such a location that a magneto-sensitive portion of said magnetic sensor element is positioned at a distance R given by $R \leq (l/2) + d$ from the center of said magnet as viewed widthwise, where d represents the distance between said magnet and said coil.

6. The printed coil unit for an actuator of a small size according to claim 4, wherein except for the spiral conductor patterns on at least one of said printed coil sheets which constitute said printed coil unit, a frequency signal generating coil having a comb-shaped conductor pattern for detecting speed is disposed a distance R from the center of said magnet, said distance R being given by the range $r_1 \times 1.2 \leq R \leq r_2 \times 1.1$ where $r_2 > (12/11) \times r_1$.

7. The printed coil unit for an actuator of a small size according to claim 5, wherein said printed coil sheet is provided with a frequency generating coil for detecting speed, said frequency generating coil having a comb-shaped conductor pattern.

8. The printed coil unit for an actuator of a small size according to claim 4, wherein the region of the coil sheet in which said magnetic sensor element is embedded is a blank region defined in part by the outer periphery of said coil sheet and the outer periphery of a selected one of said spiral conductor patterns, said selected conductor pattern being diminished in size when compared with the other spiral conductor patterns.

9. The printed coil unit for an actuator of a small size according to claim 8, wherein said magnetic sensor element incorporated integrally in said printed coil unit has a thickness not greater than 0.6 mm, and is fitted in a notch formed in said blank region of said printed coil sheet.

10. The printed coil unit for an actuator of a small size according to claim 8, wherein a frequency generating coil pattern for detecting speed is printed in said blank region of said printed coil sheet along the outer periphery thereof.

11. A flat brushless motor of a small size comprising a printed coil unit composed of a lamination of a plurality of disc-shaped printed coil sheets each having a plurality of spiral conductor patterns, said lamination constituting a stator; a magnetic yoke member for supporting said printed coil unit disposed thereon; a disc-shaped magnet disposed in opposition to said coil unit with a small cap between said magnet and said conductor pattern, said magnet being uniformly magnetized with alternating poles in the circumferential direction and serving as a rotor; and a rotatable supporting shaft for supporting said magnet and said yoke member at respective centers,
wherein said magnet has n paired magnetic poles arrayed in the circumferential direction and has an inner diameter $r_1$ and an outer diameter $r_2$, each of said printed coil sheets being provided with a row of 2n spiral conductor patterns disposed circumferentially, at least one of said printed coil sheets having opposed planar disc surfaces and a magnetic sensor element disposed in said printed coil sheet with a magneto-sensitive portion of said sensor element located in opposition to said magnet at a position within a region lying outside of said spiral conductor patterns at a distance R given by the range $r_1 \leq R \leq r_2 \times 1.1$ from the center of said magnet, said magnetic sensor element being enclosed within a notch formed in said one printed coil sheet, said sensor element being confined between the planes determined by the opposed surfaces of said one printed coil sheet.

12. The flat brushless motor according to claim 11, wherein said magnetic sensor element is selected from the group consisting of planar Hall elements and magneto-resistance elements and is disposed in a blank region defined between a selected one of said spiral conductor patterns which has a smaller outer diameter than that of said magnet and the outer periphery of the printed coil sheet, said selected printed coil sheet having an outer diameter greater than said outer diameter $r_2$.

13. The flat brushless motor according to claim 12, wherein a printed comb-shaped conductor pattern for detecting the rotational speed of the rotor is disposed in the same plane as said spiral conductor patterns in said blank region along the outer periphery thereof and spaced from said notch for receiving therein said magnetic sensor element.

14. The flat brushless motor according to claim 11, wherein in the one of said laminated printed coil sheets located nearest to said magnet, a selected one of said plurality of spiral conductor patterns is formed to have a radial projection smaller than that of the other conductor patterns on said one printed coil sheet for reducing the overall torque contribution of the coils on said one coil sheet, a plurality of said magnetic sensor elements being embedded in a region defined between said one conductor pattern of the small diameter and the outer periphery of said first printed coil sheet at positions offset by a predetermined angle in the circumferential direction.

15. The flat brushless motor according to claim 11, wherein the gap between said magnet and said magnetic yoke member is substantially 1.1 mm.

* * * * *